US009710264B2

(12) United States Patent
Abadi et al.

(10) Patent No.: US 9,710,264 B2
(45) Date of Patent: Jul. 18, 2017

(54) SCREEN ORIENTED DATA FLOW ANALYSIS

(71) Applicant: International Business Machines Corporation, Armonk, NY (US)

(72) Inventors: Aharon Abadi, Eilat (IL); Moria Abadi, Petah-Tikva (IL); Idan Ben-Harrush, Givat-Elah (IL)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/064,223

(22) Filed: Oct. 28, 2013

(65) Prior Publication Data

US 2015/0121349 A1    Apr. 30, 2015

(51) Int. Cl.
*G06F 9/44* (2006.01)
*G06F 9/45* (2006.01)

(52) U.S. Cl.
CPC .............. *G06F 8/75* (2013.01); *G06F 8/433* (2013.01)

(58) Field of Classification Search
None
See application file for complete search history.

(56) References Cited

U.S. PATENT DOCUMENTS 5,161,216 A * 11/1992 Reps et al. ............... 717/151
5,790,866 A * 8/1998 Robison .................. 717/160
2007/0233745 A1 10/2007 Pomerantz
2008/0172662 A1 * 7/2008 Harris et al. .............. 717/159
2011/0138373 A1 * 6/2011 Lane et al. ................ 717/157
2011/0167332 A1 7/2011 Nickas, Jr.
2014/0052433 A1 * 2/2014 Prasad .................. G06F 8/74
703/22

FOREIGN PATENT DOCUMENTS

EP    2400407    12/2011

OTHER PUBLICATIONS

Ryder et al. "Elimination Algorithms for Data Flow Analysis", 1986, ACM Computing Surveys, vol. 18, No. 3, pp. 277-316.*
Ferrante et al. "The Program Dependence Graph and Its Use in Optimization" 1987, ACM Transactions on Programming Languages and Systems, vol. 9, No. 3, pp. 319-349.*

(Continued)

*Primary Examiner* — Jue Louie

(57) ABSTRACT

A method for performing data flow analysis of computer code, comprising: providing computer code of a computer program having a plurality of user interface screens; dividing the computer code to a plurality of portions such that each one of the portions includes code for inducing at least one of loading and using one of the user interface screens; performing a variable usage analysis to detect which variables are at least one of calculated and used in each one of the portions; constructing a data dependence model defining dependencies among the portions based on the variable usage analysis; and identifying, for at least one of the portions and using the data dependence model, at least one unnecessary variable loaded in one of the user interface screens and not used in a respective portion and in a group of portions depending on the respective portion.

20 Claims, 3 Drawing Sheets

(56) References Cited

OTHER PUBLICATIONS

GrammaTech, "Dependence Graphs and Programing Slicing", 1999, retrieved from: http://web.archive.org/web/19990420092512/http://www.grammatech.com/papers/slicing/slicingWhitepaper.html.*

Da Cruz et al. "Slicing technique to derive the User Interface Abstract Model", 2009, Advances in Computer Science and IT, pp. 249-276.*

Joao Carlos Silva, GUISurfer: A Generic Framework for Reverse Engineering of Graphical User Interfaces, Thesis, Universidade do Minho, 2010, retrieved from: http://wiki.di.uminho.pt/twiki/pub/Research/CROSS/Publications/tesePhD-JCSilva.pdf.*

Silva et al. "The GUISurfer Tool: Towards a Language Independent Approach to Reverse Engineering GUI Code", 2010, Proceedings of the 2nd ACM SIGCHI symposium on Engineering interactive computing systems.*

* cited by examiner

SCREEN ORIENTED DATA FLOW ANALYSIS

BACKGROUND

The present invention, in some embodiments thereof, relates to data flow analysis and, more specifically, but not exclusively, to screen oriented data flow analysis.

The term static analysis relates to computer code typically refers to analysis of the instructions of a computer program that does not rely on the run-time execution of the application. In one type of static analysis, known as data-flow analysis, a program representation graph is determined of the program's control and data flows, and information is gathered about the possible values of variables at various points within the program, where the graph is used to determine those parts of the application to which data assigned to a particular variable might flow.

Contemporary compilers and integrated development environments make extensive use of program analysis in a variety of tasks, including optimization, refactoring, and validation. The more useful and more sophisticated tasks require the internal program representation produced by the program analysis algorithm to contain data-flow information. The program representation used by the analysis algorithm affects the power and efficiency of the analysis.

The growing popularity of smart mobile devices has given rise to new GUI-centered programming paradigms. The main control of an information-based mobile application is defined by the application screens and the transitions between them.

Additional background art includes M. Weiser (Program slicing. IEEE Trans. Software Engineering, SE-10(4), 1984) which is incorporated herein by reference.

SUMMARY

According to some embodiments of the present invention there is provided a method for performing data flow analysis of computer code, comprising: providing computer code of a computer program having a plurality of user interface screens; dividing the computer code to a plurality of portions such that each one of the plurality of portions includes code for inducing at least one of loading and using one of the plurality of user interface screens; performing a variable usage analysis to detect which variables are at least one of calculated and used in each one of the plurality of portions; constructing a data dependence model defining dependencies to among the plurality of portions based on the variable usage analysis; and identifying, for at least one of the plurality of portions and using the data dependence model, at least one unnecessary variable loaded in one of the plurality of user interface screens and not used in a respective the portion and in a group of portions depending on the respective portion.

Optionally, the method further comprises removing the at least one unnecessary variable from the computer code.

Optionally, the at least one unnecessary variable is obtained by access to a remote server.

Optionally, the computer program is a mobile application and each one of the plurality of portions user interface screens is separately presented on a display of a mobile device that runs the mobile application.

Optionally, the identifying is performed using adjusted data-flow equations.

Optionally, the identifying is performed using program slicing method.

A computer readable medium comprising computer executable instructions adapted to perform the method.

According to some embodiments of the present invention there is provided a system for performing data flow analysis of computer code, comprising: a slicing module which divides a computer code of a computer program, having a plurality of user interface screens, to a plurality of portions such that each one of the plurality of portions includes code for inducing at least one of loading and using one of the plurality of user interface screens; a variable usage module which performs analysis to detect which variables are at least one of calculated and used in each one of the plurality of portions a representation module which constructs a data dependence model among the plurality of portions based on the variables; and an analysis module which identifies, using the data dependence model, for at least one of the plurality of portions, at least one unnecessary variable loaded in one of the plurality of user interface screens and not used in a respective the portion and in a group of portions depending on the respective portion.

Optionally, the system further comprises an optimization module for removing the at least one unnecessary variable from the computer code according to the analysis.

Optionally, the at least one unnecessary variable is obtained by access to a to remote server.

Optionally, the computer program is a mobile application and each one of the plurality of portions user interface screens is separately presented on a display of a mobile device that runs the mobile application.

Optionally, the analysis module uses adjusted data-flow equations.

Optionally, the analysis module uses program slicing method.

According to some embodiments of the present invention there is provided a computer program product for performing data flow analysis of computer code, comprising: a computer readable storage medium; first program instructions to divide a computer code of a computer program having a plurality of user interface screens to a plurality of portions such that each one of the plurality of portions includes code for inducing at least one of loading and using one of the plurality of user interface screens; second program instructions to perform a variable usage analysis to detect which variables are at least one of calculated and used in each one of the plurality of portions; third program instructions to construct a data dependence model defining dependencies among the plurality of portions based on the variable usage analysis; and fourth program instructions to identify, for at least one of the plurality of portions and using the data dependence model, at least one unnecessary variable loaded in one of the plurality of user interface screens and not used in a respective the portion and in a group of portions depending on the respective portion; wherein the first, second, and third program instructions are stored on the computer readable storage medium.

Optionally, the computer program product further comprises fifth program instructions to removing the at least one unnecessary variable from the computer code according to the analysis.

Optionally, the at least one unnecessary variable is obtained by access to a remote server.

Optionally, the computer program is a mobile application and each one of the plurality of portions user interface screens is separately presented on a display of a mobile device that runs the mobile application.

Optionally, the identifying is performed using adjusted data-flow equations.

Optionally, the identifying is performed using program slicing method.

A computer readable medium comprising the computer program product.

Unless otherwise defined, all technical and/or scientific terms used herein to have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
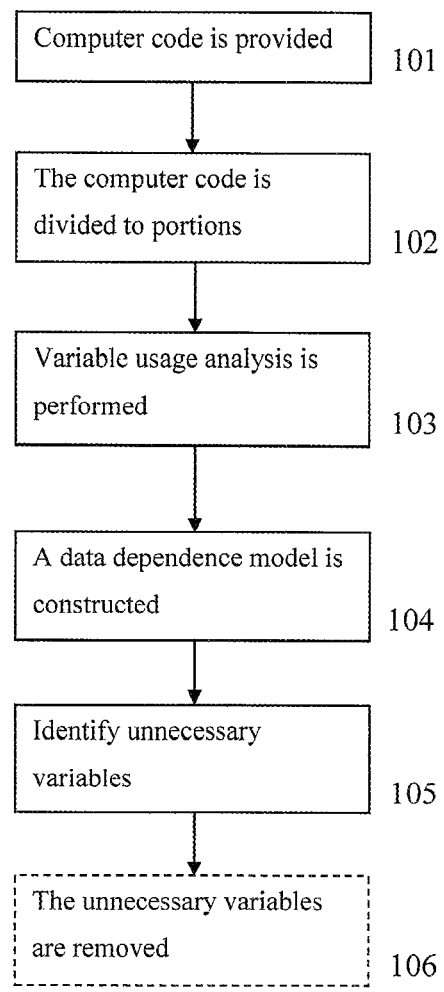
FIG. 1 is a flowchart schematically representing a method for performing screen oriented data flow analysis of computer code for detecting unnecessary variables, according to some embodiment of the present invention.

The present invention, in some embodiments thereof, relates to data flow analysis and, more specifically, but not exclusively, to screen oriented data flow analysis.

According to some embodiments of the present invention, there are provided methods and systems for performing screen oriented data flow analysis of a computer code to identify unnecessary variables embedded in the code. Unnecessary variables are variables that appear in the code, and may be loaded by the program, but are not required for the operation of the program. For example, a "current time" variable in an application that is time independent. These variables may be obtained by access to a remote server, therefore unnecessarily slowing communication to the server. Mobile networks are slow comparing to internal networks and eliminating unnecessary server accesses can accelerate the mobile networks.

Some embodiments of the present invention are based on an analysis of a control and data flow representation graph that contains states and transitions between the states, mostly optimized for mobile applications, which takes mobile applications' screen-oriented nature into account. The control flow corresponds to the workflow of a user passing between screens when using the application. Representations that contain data flow information alongside control flow are known to be especially useful regarding the power and efficiency of the analysis. In this representation graph, the application screens are the states of a finite state machine, while the touch events, communication-related triggers, and other events cause transitions between the states. The graph representation also contains data variables that are transferred between states.

Some methods and systems of the present invention include providing computer code of a computer program with multiple interface screens such as a mobile application, dividing the code to portions according the user interface screens, identifying variables used or calculated in each screen, constructing a data flow representation graph of the screens and performing data flow analysis to identify the unnecessary variables.

These methods and systems are more efficient and easier to implement then existing methods, as they are taking advantage of the program's structure of operation.

Before explaining at least one embodiment of the invention in detail, it is to be understood that the invention is not necessarily limited in its application to the details of construction and the arrangement of the components and/or methods set forth in the following description and/or illustrated in the drawings and/or the to Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution to system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart schematically representing a method for performing screen oriented data flow analysis of computer code for detecting unnecessary variables, according to some embodiment of the present invention.

First, as shown at 101, computer code of a computer program, having a multiple user interface screens is provided. The computer program may be an application for personal computer, for server computer, a web application, hardware embedded application and/or a mobile device application.

Figure 2:
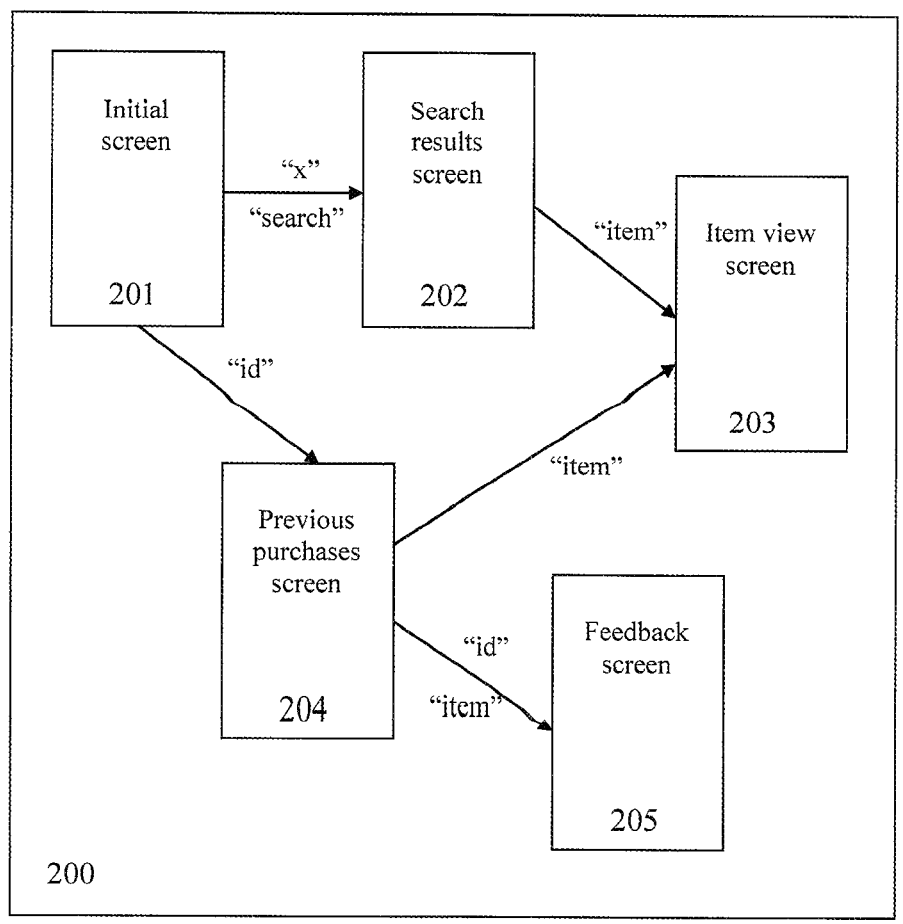
FIG. 2 is a schematic representation graph 200 of an exemplary shopping mobile application, according to some embodiment of the present invention.

Reference is also made to FIG. 2, which is a schematic representation graph 200 of an exemplary shopping mobile application, according to some embodiments of the present invention. The application allows the user to search for, buy, and sell various items. The user interface screens of the program are the initial screen 201, search results screen 202, item view screen 203, previous purchases screen 204 and feedback screen 205.

Then, as shown at 102, the computer code is divided to multiple portions, such that each one of the portions includes code for inducing loading and using one of the user interface screens. For each user interface screen a portions of the computer code is defined. For example, a portion relating to a login screen includes code for presenting the fields of username and password on the display and for receiving user input of the username and password. For example, in the shopping mobile application of FIG. 2, the computer code responsible for the execution and presentation of the search actions for search results screen 202 is considered a separate portion.

Then, as shown at 103, a variable usage analysis is performed to detect which variables are used and/or calculated in each portion. For example, in the shopping mobile application of FIG. 2, there are two control flow paths of this application. In the first control flow path when a user of the mobile application chooses to search an item on initial screen 201, initial screen 201 sends the variable "search" of the user's search term to search results screen 202 that uses the variable to perform and present the search. Search results screen 202 sends the variable "item" of the user's chosen item from the search list to item view screen 203 for the user to view. In the second control flow path, when the user chooses to see his previous purchases, initial screen 201 sends the variable "id" of the user's identification to previous purchases screen 204. When the user chooses to view an item from his previous purchases, previous purchases screen 204 sends the variable "item" of the user's chosen item to item view screen 203. When the user chooses to give feedback on one of the items he previously purchased, previous purchases screen 204 sends the variable "item" of the user's chosen item and the variable "id" of the user's identification to feedback screen 205. If the user chooses to view a previously purchased item, item view screen 203 is used again, as the two item viewing actions of are very likely implemented using the same piece of code.

Then, as shown at 104, a data dependence model, such as a control and data flow representation graph, defining dependencies among the portions and based on the variable usage analysis, is constructed. The data flows from one portion to a dependent portion. User actions that trigger transition between screens are used as edges in the representation graph, representing transition between portions in the graph. Every screen is represented as a state, and transitions between screens in the mobile application are represented as transitions in the state machine. If a variable x is set in screen S1 and subsequently used in screen S2, a data edge with the label x is added from S1 to S2. For example, representation graph 200 in the shopping mobile application of FIG. 2. User action of searching in initial screen 201 is presented as an edge for transition to search results screen 202.

Then, as shown at 105, data flow analysis is performed on the data dependence model to identify unnecessary variables loaded by a screen but are not used in a respective portion of that screen or the respective portions dependent on that screen. For example, in the shopping mobile application of FIG. 2, variable "x" is calculated by initial screen 201 and sent to search results screen 202, but is not used in initial screen 201 and/or in the screens dependent on initial screen 201 which are search results screen 202 and item view screen 203. In this case, variable "x" is identified by the data flow analysis.

The analysis may use known techniques of program slicing. Slicing is dividing the program to meaningful executable subprogram that computes the same values as the program for a given set of variables, as first described by M. Weiser (1984). The slicing is done according to the screens and previously divided portions. A common algorithm for computing program slices uses data and control dependence, and the dependence model of the screens immediately provide the data-dependence relationship: a screen that receives data from another screen has a data dependence on it. Starting from all user-visible elements in all screens, the slicing algorithm recursively traces data and control dependence relationships backwards to collect the slice.

Optionally, the standard reaching definitions data-flow equations are adjusted and used for the analysis. The IN function is the set of variables going into a screen S and is defined as a combination of all the variables coming into S from S's predecessors, which are screens that come before S in the control flow graph. The OUT function is the set of variables coming out of S are and is defined as all variables of its predecessors minus those reaching definitions whose variable is killed by S plus any new definitions generated within S. The standard KILL and GEN sets are used, wherein the KILL set is the set of variables that are written in a screen, and the GEN set is the set of variables that are read without being written first.

Optionally, the unnecessary variables, according to the analysis, are removed from the computer code. For example, in the shopping mobile application of FIG. 2, variable "x" is removed.

Optionally, some of the unnecessary variables are obtained by access to a remote server, therefore unnecessarily slowing the communication of the program to the remote server. In this case, the removal of these unnecessary variables accelerates the communication when the program is used.

Figure 3:
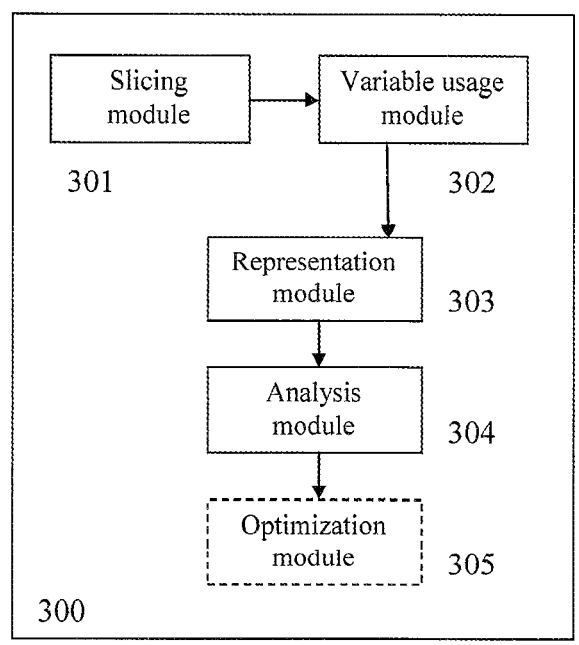
FIG. 3 is an exemplary system for performing screen oriented data flow analysis of computer code for detecting unnecessary variables, according to some embodiment of the present invention.

Reference is now made to FIG. 3, which is an exemplary system for performing screen oriented data flow analysis of computer code for detecting unnecessary variables, according to some embodiment of the present invention.

System 300 includes a slicing module 301 that divides a computer code of a computer program having multiple interface screens to multiple portions according to the user interface screens. System 300 also includes a variable usage module 302 that performs analysis to detect which variables used or calculated in each of the portions created by slicing module 301 and a representation module 303 that constructs a data dependence model of the portions and variables. Also, system 300 includes an analysis module 304 that identifies, for each portion created by slicing module 301, unnecessary variables calculated in said portion and not used in that portion and also not used in portions depending on it, according to the data dependence model constructed by representation module 302. Optionally, system 300 also includes an optimization module 305 for removing the unnecessary variables identified by analysis module 304 from the computer code.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for data flow analysis will be developed and the scope of the term data flow analysis is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed to subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for performing data flow analysis of computer code, comprising:
   providing computer code of a computer program having a plurality of user interface screens;
   dividing said computer code to a plurality of portions according to said plurality of user interface screens, wherein each of said plurality of portions is related to another one of said plurality of user interface screens and includes code for inducing at least one of loading and using of said another one of said plurality of user interface screens and wherein an execution flow from each one of said plurality of portions to another one of said plurality of portions is associated with a transition from a respective first user interface screen to a respective second user interface screen;
   performing a variable usage analysis to detect which variables are at least one of calculated and used in each one of said plurality of portions;
   constructing a data dependence model defining dependencies among said plurality of portions based on said variable usage analysis, wherein said data dependence model includes data variables that are transferred between code implementing said user interface screens of said plurality of portions; and
   identifying, for at least one of said plurality of portions and using said data dependence model, at least one unnecessary variable loaded in one of said plurality of user interface screens and not used in a respective said portion and in a group of portions depending on said respective portion, wherein said at least one unnecessary variable appears in said code implementing said user interface screen of said portion.

2. The method of claim 1, further comprising:
   removing said at least one unnecessary variable from said computer code.

3. The method of claim 1, wherein said at least one unnecessary variable is obtained by access to a remote server.

4. The method of claim 1, wherein said computer program is a mobile application and each one of said plurality of portions user interface screens is separately presented on a display of a mobile device that runs said mobile application.

5. The method of claim 1, wherein said identifying is performed using adjusted data-flow equations.

6. The method of claim 1, wherein said identifying is performed using program slicing method.

7. The method of claim 1, wherein said data dependence model is represented as a graph wherein said portions are states of a finite state machine, and wherein said graph includes said data variables that are transferred between said states.

8. The method of claim 7, wherein said data variables are transferred between said states according to at least one of touch events and communication-related triggers.

9. A system for performing data flow analysis of computer code, comprising:
   a processor;
   a non-transitory computer readable medium comprising computer executable instructions executable by the processor, comprising:
   instructions to divide a computer code of a computer program, having a plurality of user interface screens, to a plurality of portions according to said plurality of user interface screens, wherein each of said plurality of portions is related to another one of said plurality of user interface screens and includes code for inducing at least one of loading and using of said another one of said plurality of user interface screens and wherein an execution flow from each one of said plurality of portions to another one of said plurality of portions is associated with a transition from a respective first user interface screen to a respective second user interface screen;
   instructions to perform an analysis to detect which variables are at least one of calculated and used in each one of said plurality of portions instructions to construct a data dependence model among said plurality of portions based on said variables, wherein said data dependence model includes data variables that are transferred between code implementing said user interface screens of said plurality of portions; and
   instructions to identify, using said data dependence model, for at least one of said plurality of portions, at least one unnecessary variable loaded in one of said plurality of user interface screens and not used in a respective said portion and in a group of portions depending on said respective portion, wherein said at least one unnecessary variable appears in said code implementing said user interface screen of said portion.

10. The system of claim 9, further comprising:
instructions to remove said at least one unnecessary variable from said computer code according to said analysis.

11. The system of claim 9, wherein said at least one unnecessary variable is obtained by access to a remote server.

12. The system of claim 9, wherein said computer program is a mobile application and each one of said plurality of portions user interface screens is separately presented on a display of a mobile device that runs said mobile application.

13. The system of claim 9, wherein said instructions to identify comprises instructions to use adjusted data-flow equations.

14. The system of claim 9, wherein said instructions to identify comprises instructions to use a program slicing method.

15. A computer program product for performing data flow analysis of computer code, comprising:
a non-transitory computer readable storage medium;
first program instructions to divide a computer code of a computer program, having a plurality of user interface screens, to a plurality of portions according to said plurality of user interface screens, wherein each of said plurality of portions is related to another one of said plurality of user interface screens and includes code for inducing at least one of loading and using of said another one of said plurality of user interface screens and wherein an execution flow from each one of said plurality of portions to another one of said plurality of portions is associated with a transition from a respective first user interface screen to a respective second user interface screen;
second program instructions to perform a variable usage analysis to detect which variables are at least one of calculated and used in each one of said plurality of portions;
third program instructions to construct a data dependence model defining dependencies among said plurality of portions based on said variable usage analysis, wherein said data dependence model includes data variables that are transferred between code implementing said user interface screens of said plurality of portions; and
fourth program instructions to identify, for at least one of said plurality of portions and using said data dependence model, at least one unnecessary variable loaded in one of said plurality of user interface screens and not used in a respective said portion and in a group of portions depending on said respective portion, wherein said at least one unnecessary variable appears in said code implementing said user interface screen of said portion;
wherein said first, second, third, and fourth program instructions are stored on said computer readable storage medium.

16. The computer program product of claim 15, further comprising:
fifth program instructions to removing said at least one unnecessary variable from said computer code according to said analysis.

17. The computer program product of claim 15, wherein said at least one unnecessary variable is obtained by access to a remote server.

18. The computer program product of claim 15, wherein said computer program is a mobile application and each one of said plurality of portions user interface screens is separately presented on a display of a mobile device that runs said mobile application.

19. The computer program product of claim 15, wherein said identifying is performed using adjusted data-flow equations.

20. The computer program product of claim 15, wherein said identifying is performed using program slicing method.

* * * * *